MANUFACTURE OF SEMICONDUCTOR DEVICES
Filed June 4, 1964
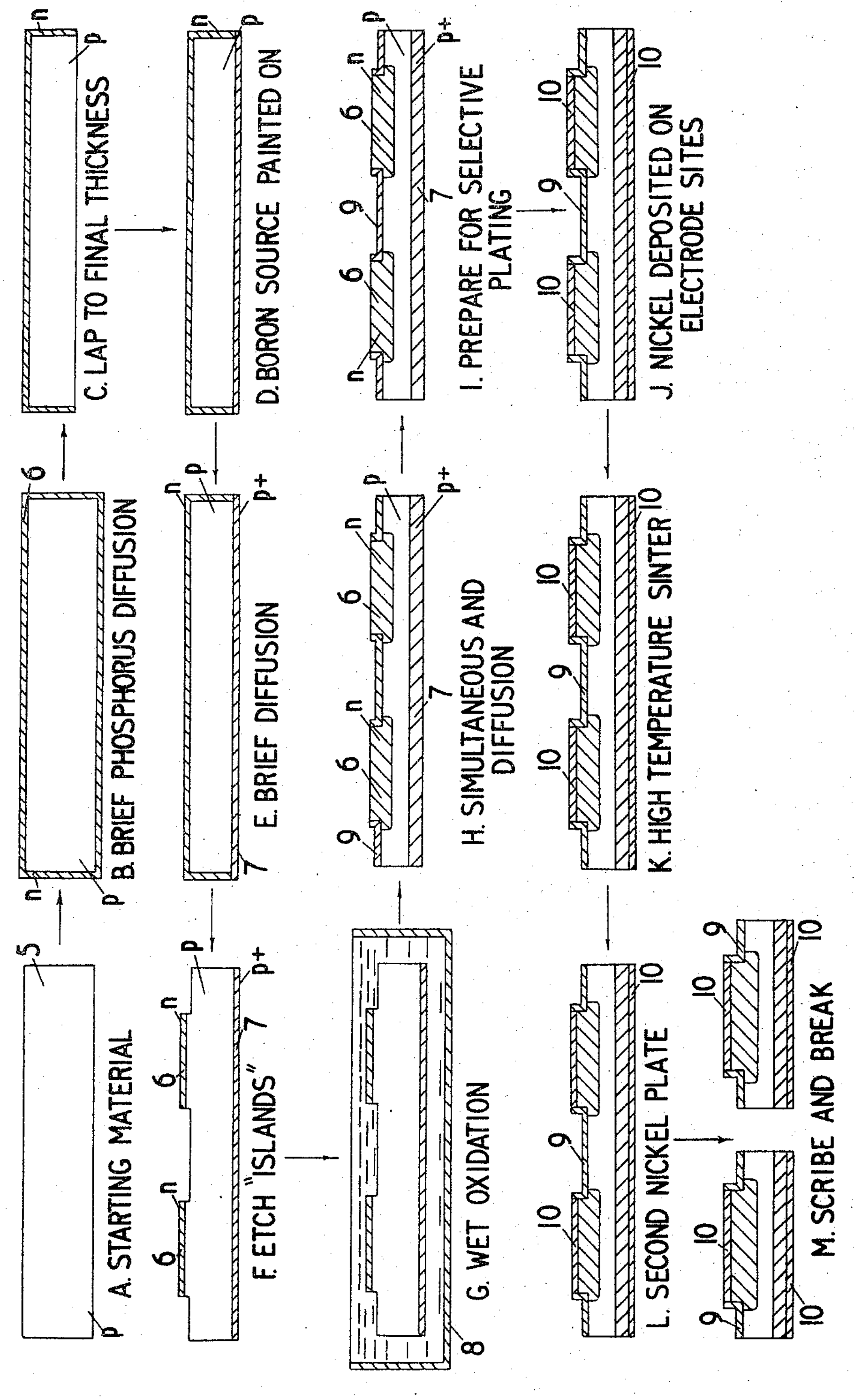

United States Patent Office 3,328,216

Patented June 27, 1967

3,328,216

MANUFACTURE OF SEMICONDUCTOR DEVICES

Richard Stanley Brown, Sutton Coldfield, and Herbert William Gulliver, Handsworth, England, assignors to Joseph Lucas (Industries) Limited, Birmingham, England Filed June 4, 1964, Ser. No. 372,630

Claims priority, application Great Britain, June 11, 1963, 23,167/63

1 Claim. (Cl. 148—187)

This invention relates to a method of manufacturing a semiconductor device, and more particularly to a method of the kind including the steps of diffusing an impurity into a silicon slice to form a p-n junction, and forming a protective silicon dioxide layer over said junction by an oxidation process.

According to the invention, a method of the kind specified is characterized in that part of the diffusion process and the oxidation process are carried out simultaneously.

The invention further resides in a semiconductor device whenever manufactured by a method as specified in the preceding paragraph.

The accompanying drawing is a flow sheet illustrating an example of the invention applied to the manufacture of a semiconductor diode. In the drawing, the various stages are indicated by reference letters A to M respectively and it will be appreciated that the various layers and coatings are not drawn to scale.

Initially, a p conductivity type slice or wafer 5 indicated at A is cut from a crystal of silicon of resistivity between 1.5 and 2.5 ohm-centimetres. The crystal is cut to a thickness of not less than 0.012 inch and then lapped on its upper side only to a thickness of 0.010±0.0005 inch. The slice is then diffused in phosphorus pentoxide vapor for 1 hour ± 5 minutes at a temperature of 1250 ± 10° C., and is then removed from the furnace and allowed to cool to atmospheric temperature. This diffusion process produces concentrated n-type layers 6 on both the lapped and unlapped surfaces of the slice, as indicated at B, the concentrated n-type layers being themselves coated with a phosphorus glass (not shown).

The slice is now lapped on its unlapped side to remove the phosphorus glass and concentrated n-type layer on the unlapped side as indicated at C, this operation reducing the slice to a thickness of 0.008±0.0005 inch. The slice is painted on the glass-free surface with a 10% solution of boric oxide in ethylene glycol mcmomethyl ether as shown at D and is then air dried, and diffused at about 1250° C. for 30±5 minutes, after which it is quickly removed from the furnace and allowed to cool to atmospheric temperature. As indicated at E, this second diffusion process forms a concentrated p-type layer 7 on the face of the slice, this layer being covered with a boron glass (not shown).

The slice is now placed on a glass slide covered with a layer of wax, the boron glass being in contact with the slide so that the phosphorus glass layer is exposed. A suitably shaped steel mask is then placed over the phosphorus glass layer, which is then sprayed with an acid resist. The acid resist is then sintered, and forms a protective layer covering parts of the n-type layer 6.

The steel mask is now removed and the phosphorus glass is removed, except in the region protected by the resist, by treatment in a 1:1 solution of hydrofluoric acid in water for 2 minutes at about 20° C. The n-type layer 6 which is not protected by the resist is then removed by treatment with a mixture of 9 parts by volume of nitric acid of specific gravity 1.42 and one part of 40% hydrofluoric acid, the treatment being carried out for 15 minutes at a temperature in the range 8° to 12° C. The slice is then immediately washed throroughly in de-ionized water, removed from the waxed slide by trichloroethylene, washed in several changes of trichloroethylene and air-dried. The slice now has the form shown at F, and it will be appreciated that in addition to the method described, other known methods can be used to form the selected n-type regions 6 seen at F.

It is now necessary to subject the slice to a diffusion process to allow the impurities to penetrate deeper into the slice, and to cover the exposed silicon with a protective oxidized layer. In order to accomplish this the slice is first heated in concentrated chromic acid in a water bath 8 indicated at G at 100° C. for one hour. This slice is then removed from the acid and thoroughly washed in at least five changes of deionized water. The slice is then transferred to a quartz furnace without drying and is supported with its rectifier pattern uppermost on a quartz boat. Oxidation and diffusion are carried out simultaneously at 1250±10° C. for 16 hours with pure dry oxygen flowing into the furnace at a rate of about 1 to 1.5 cubic feet per hour. At the end of this period the furnace and its contents are cooled at not more than 10° C. per minute to about 400° C., after which the contents of the furnace may safely be removed. The slice now has the form shown at H, from which it will be seen that the p++-type region 7 has diffused into the slice, and the n-type regions 6 have diffused both into the slice and across the slice for a short distance. Moreover, the upper surface of the p-type region 5 and the vertical junctions of the n-type regions 6 with the region 5 have been covered with a silicon dioxide layer 9 but such a layer has not been formed on the n-type region 6 and the p++-type region 7 because these regions were already covered by phosphorus glass and boron glass respectively.

The next step is to remove the phosphorus and boron glass layers while leaving the silicon dioxide layer intact.

The phosphorus glass is more soluble in solutions of caustic alkalis than the protective film of silicon dioxide. A hot (80° C.) 5% solution of potassium hydroxide in water is used to expose the silicon substrate from those areas to be plated which are covered with a phosphorus glass, with the immersion time in the potassium hydroxide depending on the thickness of the glass.

The slice now has the appearance shown at I.

After exposure of the silicon substrate, its surface may be activated to accept the first electroless nickel plate by the use of an acidified solution of palladium chloride. As a result of this stage, the regions 6 and 7 are covered with a plating 10 of nickel as shown at J. The adhesion of the first nickel plate is ensured by sintering the wafer at 600° C.–800° C. in a furnace purged with dry forming gas and from which air is excluded for a period of about 15 minutes, followed by a slow cool to below 400° C. at a rate not exceeding 10° C. per minute, with the slice now being at stage K in the drawing. A second layer of nickel is then deposited onto the sintered layer after re-activation in either 30% fluorosilicic acid or dilute hydrofluoric acid, depending on how much attack on the protective film of silicon dioxide can be tolerated, this stage of the process being indicated at L. Finally, the slice is scribed and broken into individual rectifiers as indicated at M.

Although an example of the invention has been described with reference to diodes, it will be appreciated that similar techniques can be used to form p-n junctions in transistors and other semiconductor devices.

Having thus described our invention what we claim as new and desire to secure by Letters Patent is:

A method of producing a semiconductor device having a p-n junction, including diffusing a p-type silicon wafer having a lapped surface and an unlapped surface in phosphorous pentoxide vapor for providing an n-type layer coated with a phosphorous glass on both the lapped and unlapped surfaces of the wafer, lapping the wafer on the unlapped surface to remove the phosphorous glass and concentrated n-type layer on the unlapped surface, treating the original unlapped surface, following said removal of the phosphorous glass and concentrated n-type layer, with a solution of a boron compound, diffusing a concentrated p-type layer on the treated unlapped surface coated with a boron glass, positioning a shaped mask on the surface having the n-type layer, spraying the mask with an acid resist, sintering the acid resist for providing a protective covering for the unmasked portions of the n-type layer, removing the mask and the portions of the n-type layer not having the protective covering, simultaneously diffusing and oxidizing the wafer to cover the exposed silicon with a protective oxide layer, removing the phosphorous glass by potassium hydroxide, covering the wafer surfaces with nickel, sintering the nickel covered surfaces, applying a second nickel covering to the wafer, and scribing and breaking the wafer into individual devices.

References Cited

UNITED STATES PATENTS

| | | | |
|---|---|---|---|
| 2,873,222 | 2/1959 | Derick | 148—187 X |
| 2,930,722 | 3/1960 | Ligenza | 148—189 |
| 2,962,394 | 11/1960 | Andres. | |
| 2,974,073 | 3/1961 | Armstrong | 148—189 X |
| 3,154,450 | 10/1964 | Hockelman | 148—189 |
| 3,184,823 | 5/1965 | Little | 148—187 X |
| 3,203,840 | 8/1965 | Harris | 148—189 X |
| 3,226,612 | 12/1965 | Haenichen | 148—186 X |

HYLAND BIZOT, *Primary Examiner.*